US008305873B2

United States Patent
Noh et al.

(10) Patent No.: US 8,305,873 B2
(45) Date of Patent: Nov. 6, 2012

(54) METHOD AND APPARATUS FOR TRANSMITTING SEQUENCE IN WIRELESS COMMUNICATION SYSTEM

(75) Inventors: Min Seok Noh, Anyang-si (KR); Jin Sam Kwak, Anyang-si (KR); Sung Ho Moon, Anyang-si (KR); Seung Hee Han, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 12/997,558

(22) PCT Filed: Jan. 7, 2010

(86) PCT No.: PCT/KR2010/000106
§ 371 (c)(1),
(2), (4) Date: Dec. 10, 2010

(87) PCT Pub. No.: WO2010/079980
PCT Pub. Date: Jul. 15, 2010

(65) Prior Publication Data
US 2011/0105056 A1    May 5, 2011

Related U.S. Application Data

(60) Provisional application No. 61/143,470, filed on Jan. 9, 2009.

(30) Foreign Application Priority Data

Jan. 5, 2010  (KR) .......................... 10-2010-0000449

(51) Int. Cl.
*H04J 11/00* (2006.01)
*H04K 3/00* (2006.01)
(52) U.S. Cl. ........................................ 370/208; 375/273
(58) Field of Classification Search .................. 370/208, 370/210; 375/273, 279–283
See application file for complete search history.

(56) References Cited

U.S. PATENT DOCUMENTS
2009/0204874 A9 *  8/2009  Lakkis .......................... 714/783

FOREIGN PATENT DOCUMENTS
KR          10-0670417 B1      1/2007
KR          10-0717972 B1      5/2007
KR       10-2008-0021241 A     3/2008

* cited by examiner

*Primary Examiner* — Lee Nguyen
(74) *Attorney, Agent, or Firm* — Lee, Hong, Degerman, Kang & Waimey

(57) ABSTRACT

A method and apparatus for transmitting a sequence in a wireless communication system is provided. A transmitter generates a block sequence comprising a first sub-block sequence and a second sub-block sequence, generates a phase modulated block sequence by performing phase modulation on the block sequence, maps the phase modulated block sequence to a plurality of sub-blocks, and transmits the phase modulated block sequence mapped to the plurality of sub-blocks.

15 Claims, 10 Drawing Sheets

[Fig. 1]
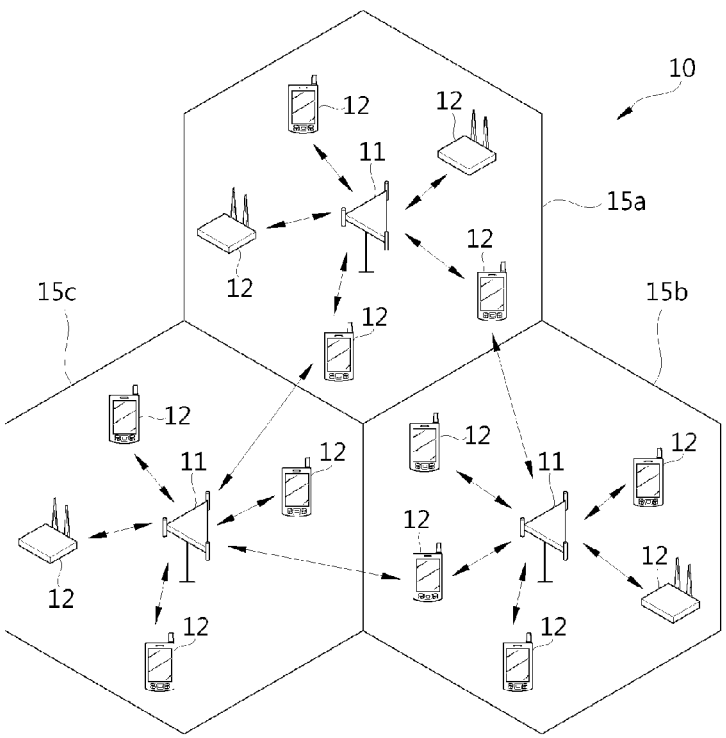
[Fig. 2]
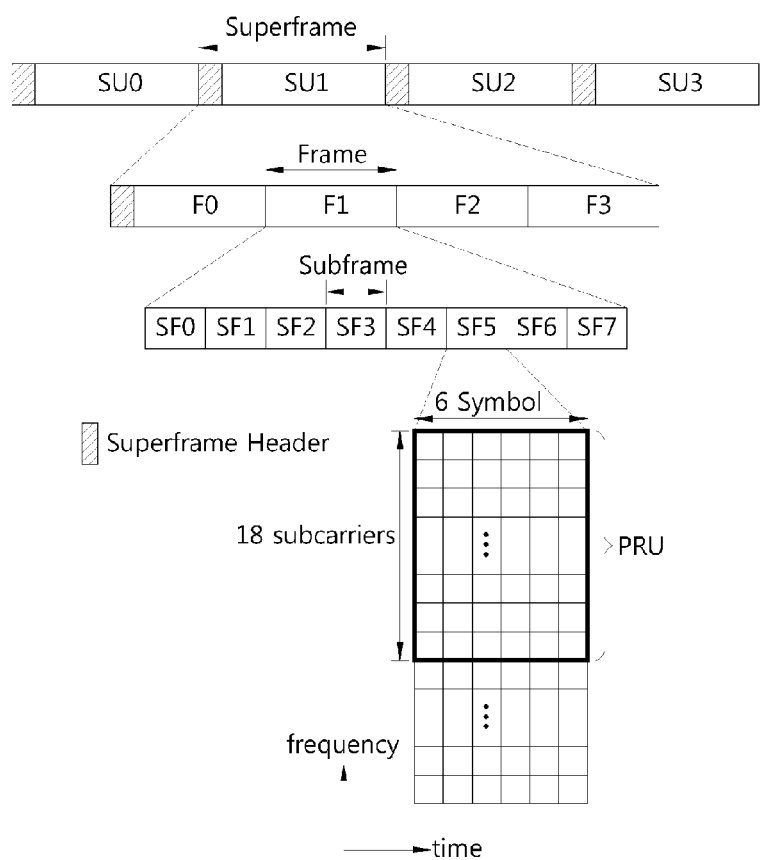

[Fig. 3]
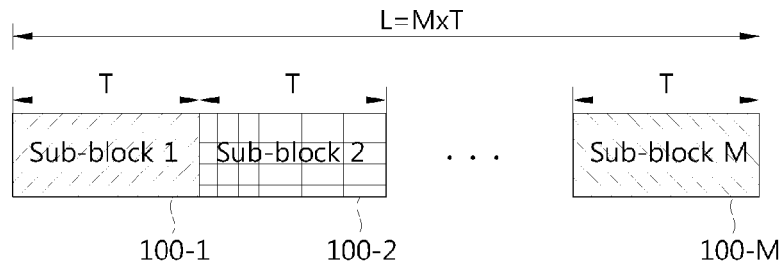
[Fig. 4]
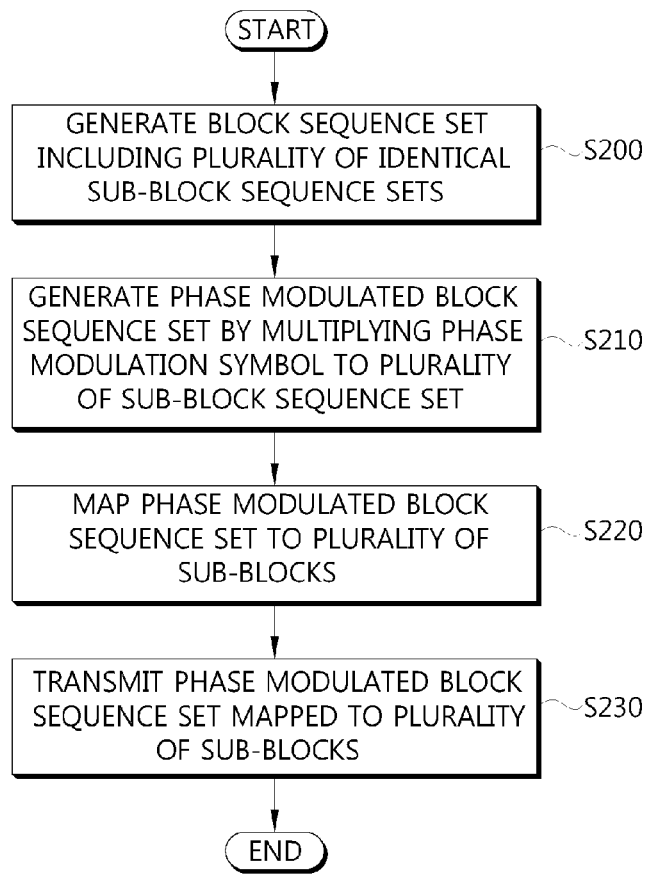
[Fig. 5]
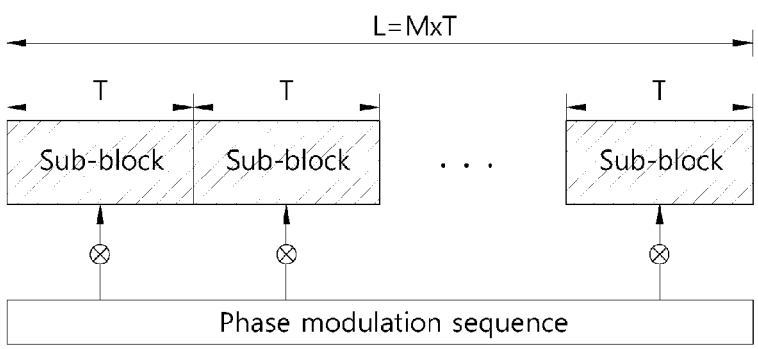

[Fig. 6]
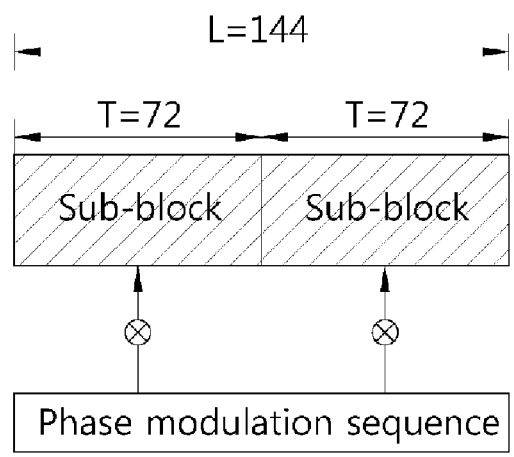
[Fig. 7]
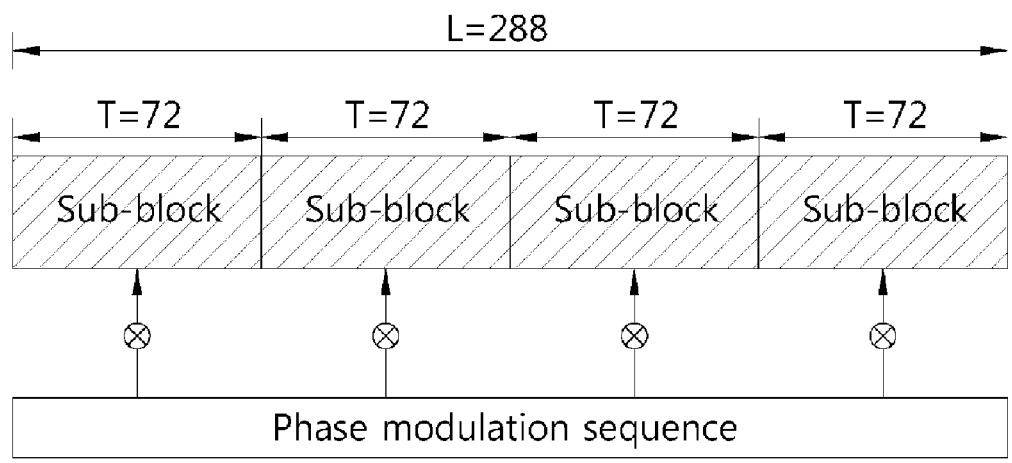

[Fig. 8]
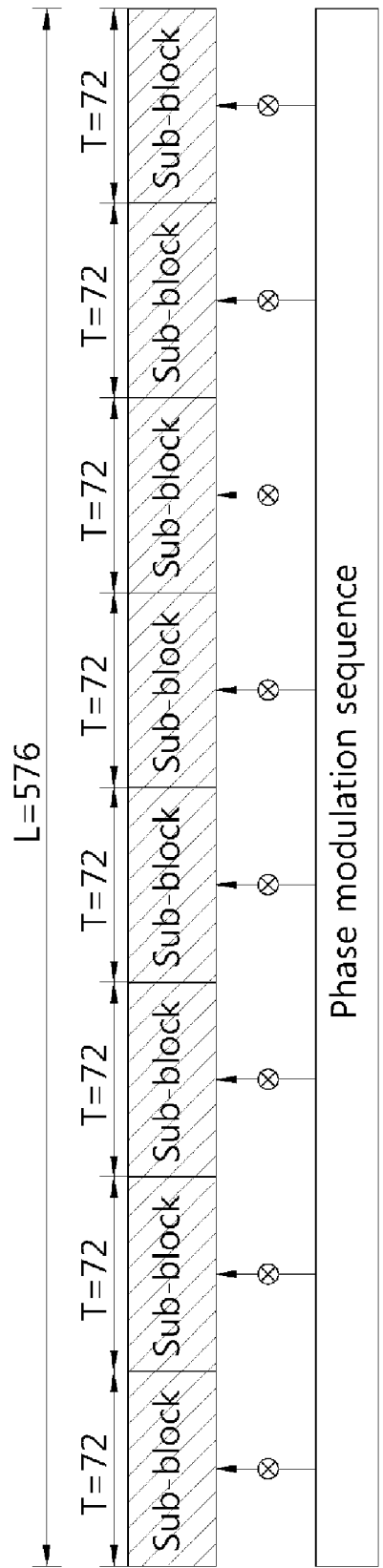

[Fig. 9]
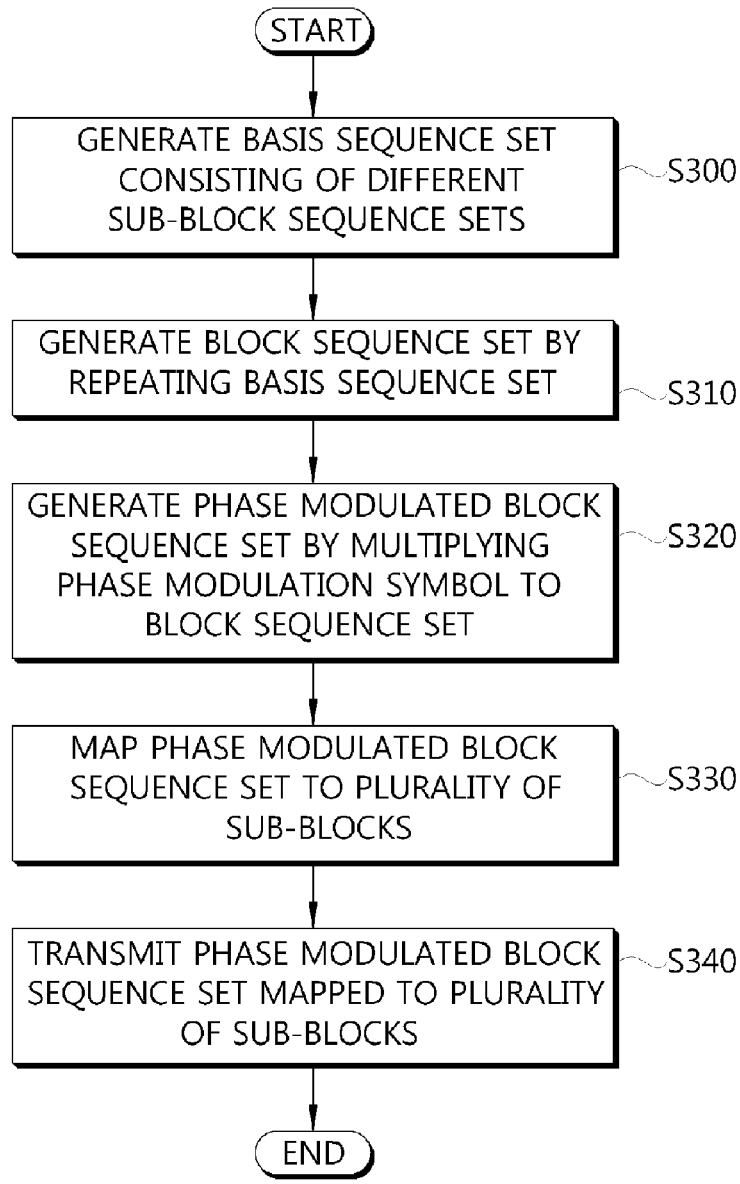
[Fig. 10]
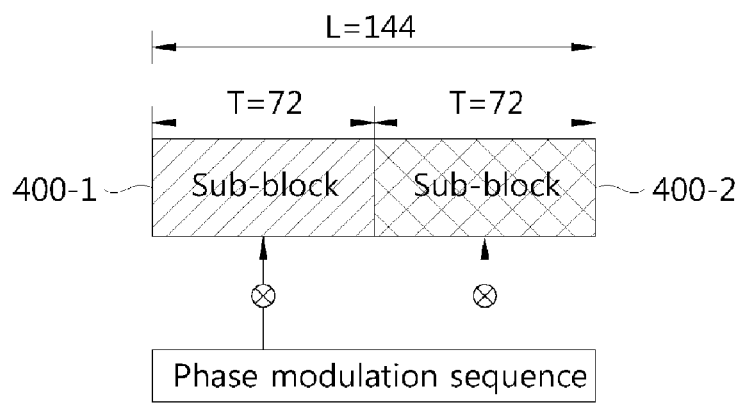

[Fig. 11]
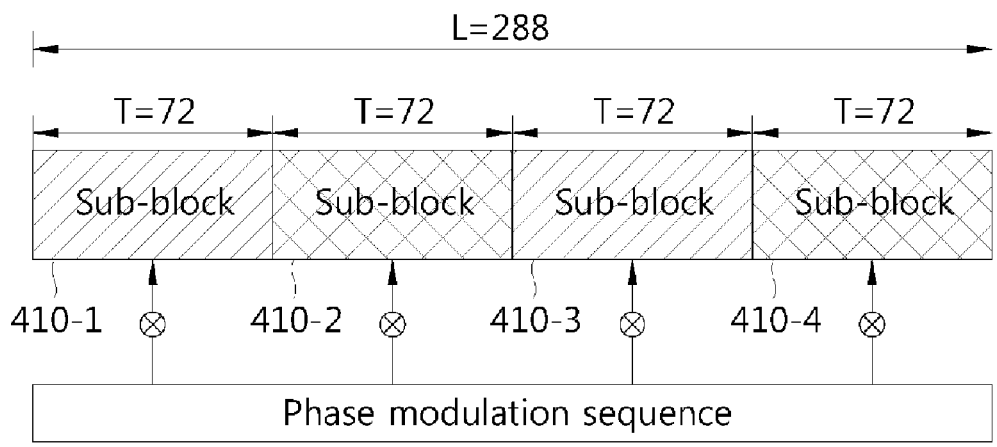
[Fig. 12]
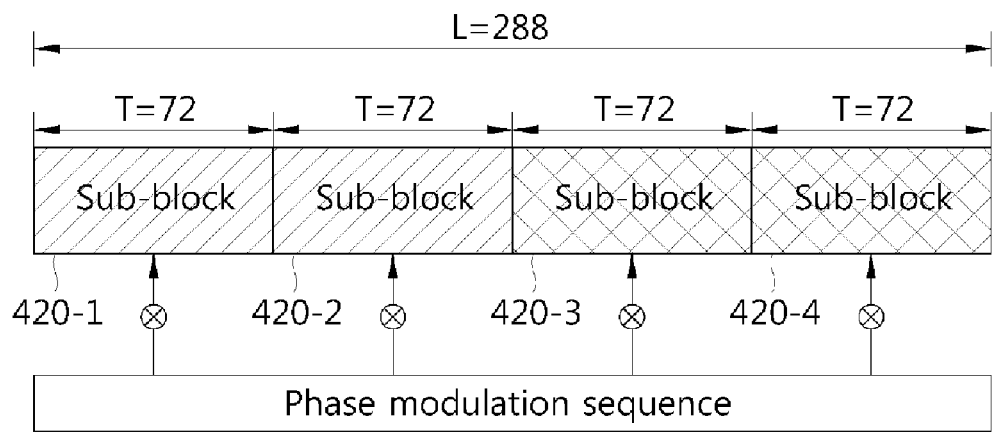

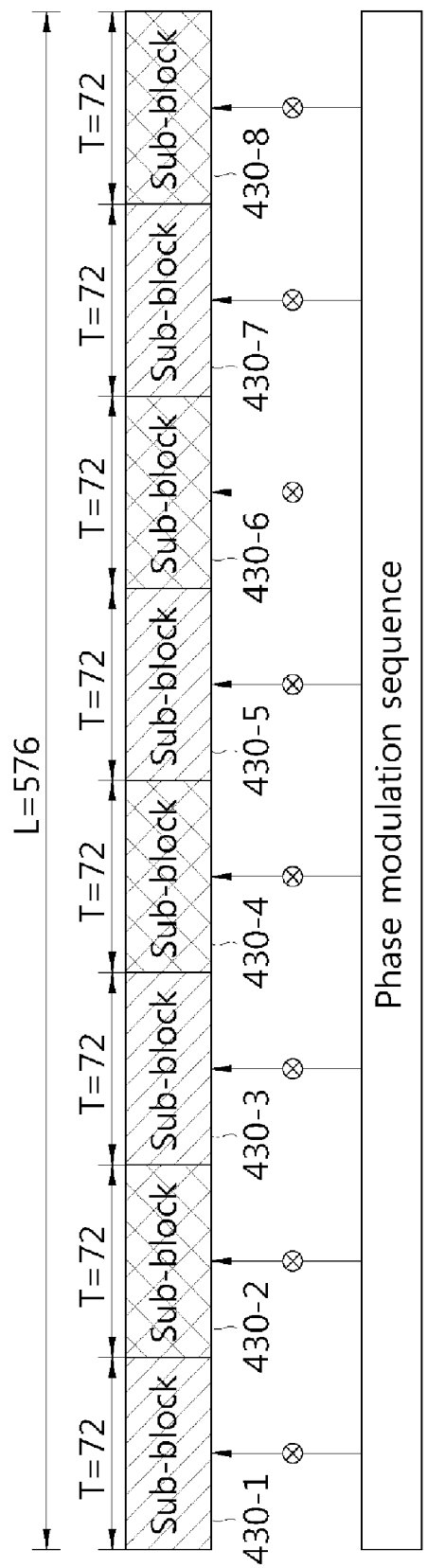
[Fig. 13]

[Fig. 14]
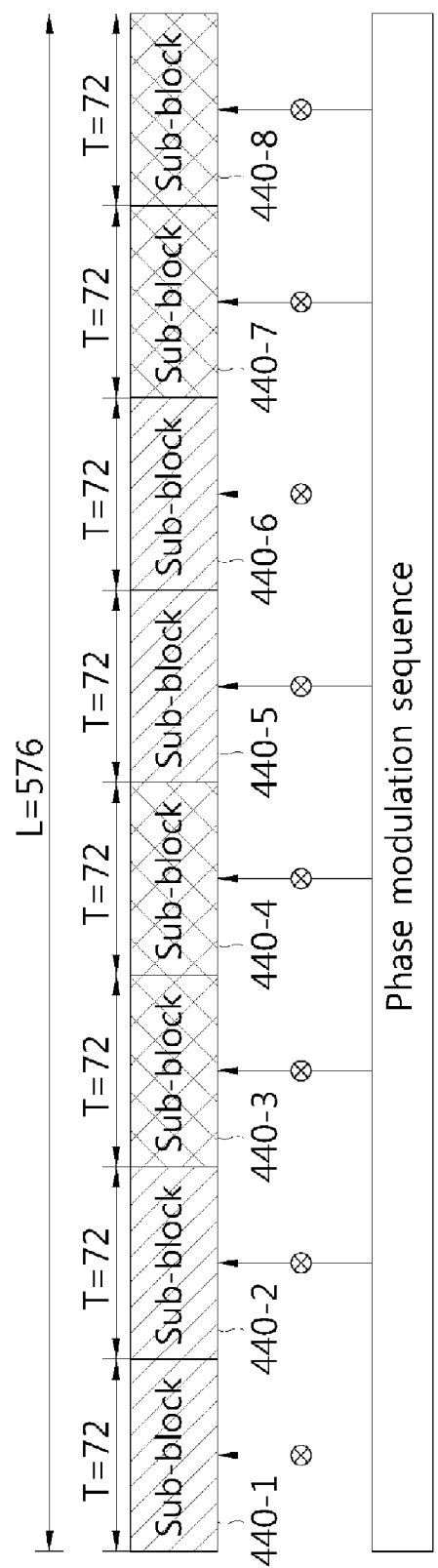

[Fig. 15]
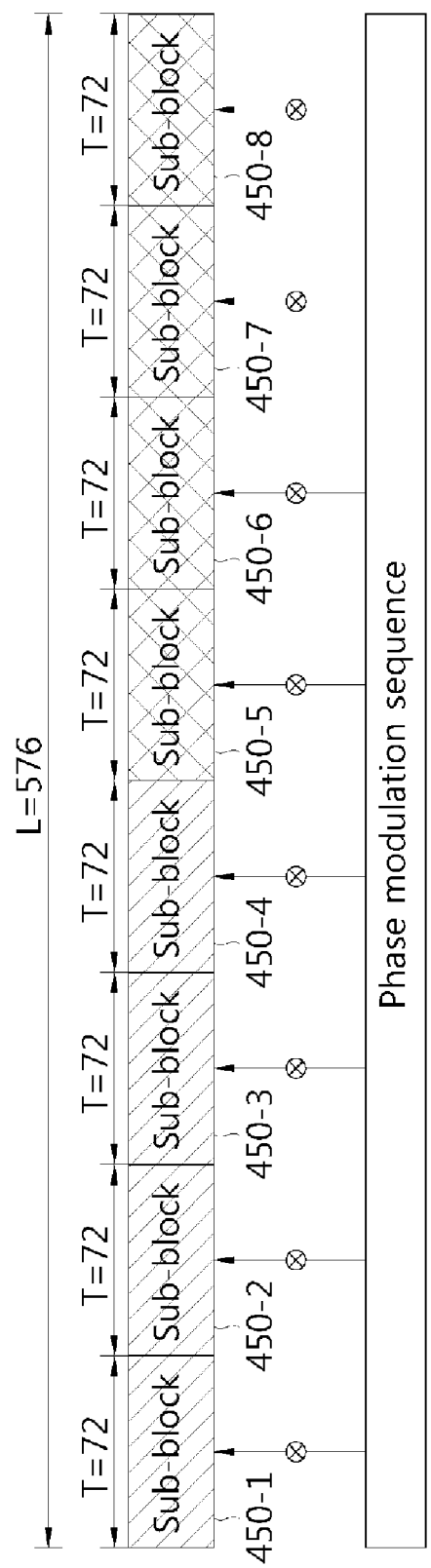

[Fig. 16]
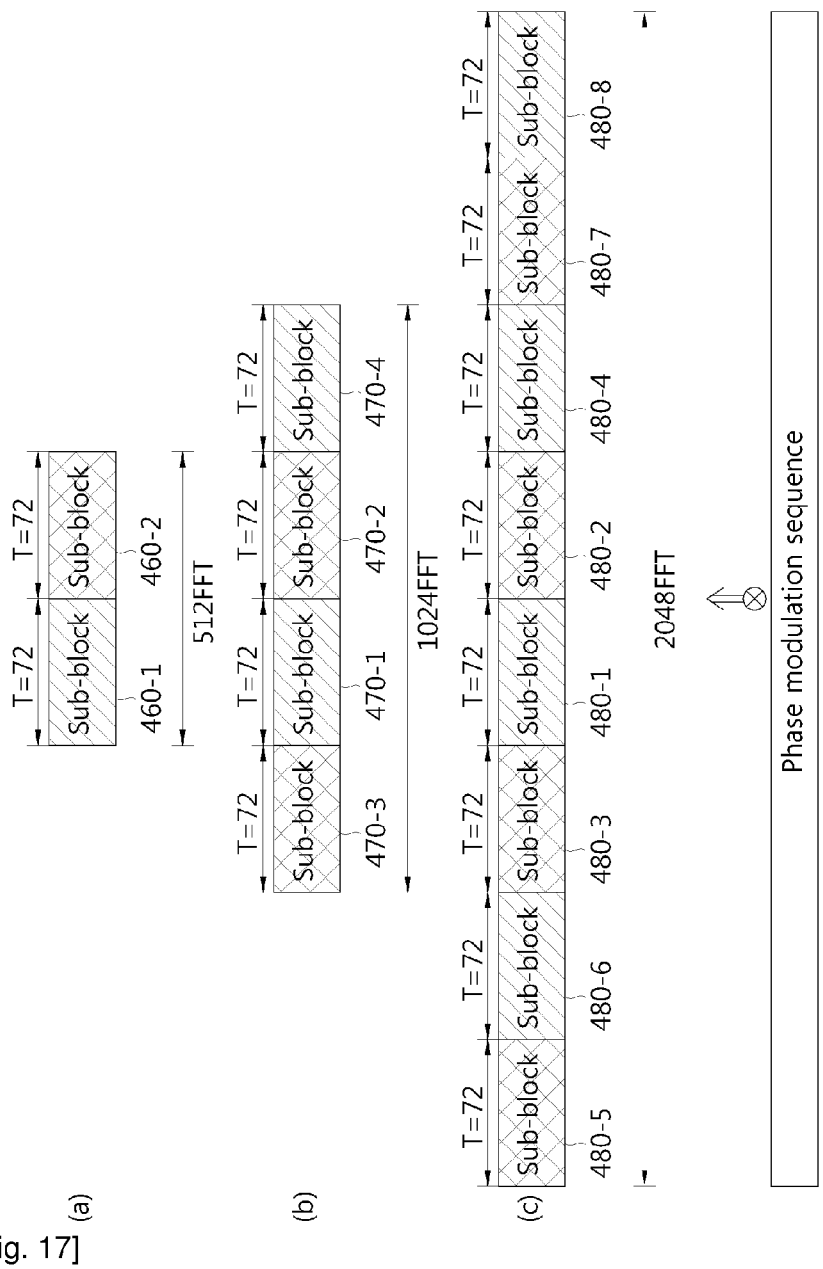
[Fig. 17]
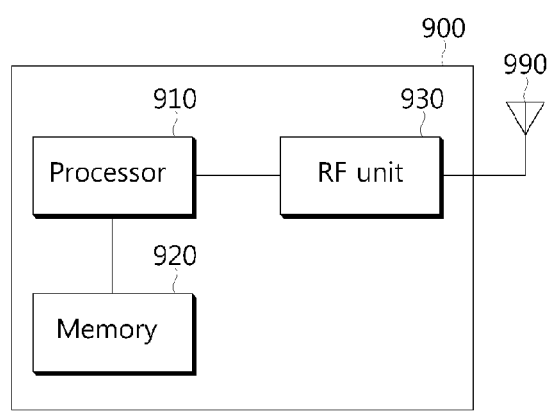

METHOD AND APPARATUS FOR TRANSMITTING SEQUENCE IN WIRELESS COMMUNICATION SYSTEM

CROSS-REFERENCE TO RELATED APPLICATIONS

This application is a 371 U.S. national stage application of International Application No. PCT/KR2010/000106, filed on Jan. 7, 2010, which claims priority to Korean Application No. 10-2010-0000449, filed on Jan. 5, 2010, and U.S. Provisional Application Ser. No. 61/143,470, filed on Jan. 9, 2009, the contents of which are incorporated by reference herein in their entirety.

TECHNICAL FIELD

The present invention relates to wireless communications, and more particularly, to a method and apparatus for Transmitting a sequence with a low peak-to-average power to ratio (PAPR) and cubic metric (CM) in a wireless communication system.

BACKGROUND ART

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

A sequence is widely used in a wireless communication system. In an OFDM/OFDMA system, a transmitter transmits respective elements constituting the sequence by mapping them to respective subcarriers. In general, the sequence preferably satisfies the following properties.

1) a correlation property suitable for providing excellent detection capability
2) a low peak-to-average power to ratio (PAPR) and cubic metric (CM) for maximizing efficiency of a power amplifier
3) a sufficient number of sequences for facilitating large-sized information transmission or cell-planning
4) a sequence that can be generated in a closed-form when a base station or a mobile station stores sequences in a look-up table format The sequence is used for transmission of a preamble, a ranging channel, a pilot, a downlink/uplink control channel, a scrambling code, or the like, thereby capable of performing signal detection, channel estimation, multiplexing, or the like. When the sequence is generated, sequences allocated to a plurality of sub-blocks can be gathered so that the generated sequence has a desired length. In this case, even if each sub-block has an excellent sequence property, a sequence configured by gathering respective sequences to have a total length of the sequences may have a new property different from a property of each sequence.

Accordingly, there is a need for a method for generating a sequence with an excellent correlation property and a low PAPR and CM by maximizing the number of available sequences.

DISCLOSURE OF INVENTION

Technical Problem

The present invention provides a method and apparatus for transmitting a sequence with a low peak-to-average power to ratio (PAPR) and cubic metric (CM) in a wireless communication system.

Solution to Problem

In an aspect, a method for transmitting a sequence in a wireless communication system is provided. The method include generating a block sequence comprising a first sub-block sequence and a second sub-block sequence, generating a phase modulated block sequence by performing phase modulation on the block sequence, mapping the phase modulated block sequence to a plurality of sub-blocks, and transmitting the phase modulated block sequence mapped to the plurality of sub-blocks. The first sub-block sequence may be the same as the second sub-block sequence. The first sub-block sequence may be different from the second sub-block sequence. The block sequence may further comprise a first repetition sub-block sequence and a second repetition sub-block sequence, and the first repetition sub-block sequence is the same as the first sub-block sequence, and the second repetition sub-block sequence is the same as the second sub-block sequence. The first sub-block sequence, the second sub-block sequence, the first repetition sub-block sequence, and the second repetition sub-block sequence which compose the block sequence may be circulated in an order of {the first sub-block sequence, the second sub-block sequence, the first repetition sub-block sequence, and the second repetition sub-block sequence} or in an order of {the first sub-block sequence, the first repetition sub-block sequence, the second sub-block sequence, and the second repetition sub-block sequence}. The phase modulation may be performed on each sub-block sequence which composes the block sequence. The phase modulation may be performed by multiplying a phase modulation symbol respectively to each of the first sub-block sequence and the second sub-block sequence which composes the block sequence. The phase modulation symbol may be one of $\{\pi/4, 3\pi/4, 5\pi/4, 7\pi/4\}$. The phase modulation symbol may be one of $\{0, \pi\}$ or $\{\pi/2, 3\pi/2\}$.

In another aspect, a transmitter in a wireless communication system is provided. The transmitter include a radio frequency (RF) unit for transmitting and receiving a radio signal, and a processor operatively coupled to the RF unit and configured to generate a block sequence comprising a first sub-block sequence and a second sub-block sequence, generate a phase modulated block sequence by performing phase modulation on the block sequence, map the phase modulated block sequence to a plurality of sub-blocks, and transmit the phase modulated block sequence which is mapped to the plurality of sub-blocks. The phase modulation may be performed on each sub-block sequence which composes the block sequence. The phase modulation may be performed by multiplying a phase modulation symbol respectively to each of the first sub-block sequence and the second sub-block sequence which composes the block sequence.

Advantageous Effects of Invention

According to the present invention, a sequence with a desired length and with a low peak-to-average power to ratio (PAPR) and cubic metric (CM) can be generated, and cross-correlation can be decreased.

BRIEF DESCRIPTION OF DRAWINGS

FIG. 1 shows a wireless communication system.
FIG. 2 is an example of a frame structure.
FIG. 3 shows an example of a method of generating a sequence by using sub-blocks.
FIG. 4 is a flowchart showing the proposed sequence transmission method according to an embodiment of the present invention.
FIG. 5 shows an example of a phase modulated block sequence obtained by the proposed sequence transmission method.
FIG. 6 shows another example of a phase modulated block sequence obtained by the proposed sequence transmission method.
FIG. 7 shows another example of a phase modulated block sequence obtained by the proposed sequence transmission method.
FIG. 8 shows another example of a phase modulated block sequence obtained by the proposed sequence transmission method.
FIG. 9 is a flowchart showing the proposed sequence transmission method according to another embodiment of the present invention.
FIG. 10 shows an example of a phase modulated block sequence obtained by the proposed sequence transmission method.
FIG. 11 shows another example of a phase modulated block sequence obtained by the proposed sequence transmission method.
FIG. 12 shows another example of a phase modulated block sequence obtained by the proposed sequence transmission method.
FIG. 13 shows another example of a phase modulated block sequence obtained by the proposed sequence transmission method.
FIG. 14 shows another example of a phase modulated block sequence obtained by the proposed sequence transmission method.
FIG. 15 shows another example of a phase modulated block sequence obtained by the proposed sequence transmission method.
FIG. 16 shows another example of a phase modulated block sequence obtained by the proposed sequence transmission method.
FIG. 17 is a block diagram showing a transmitter according to an embodiment of the present invention.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A sequence is widely used in a wireless communication system. The sequence is used for transmission of a preamble, a ranging channel, a pilot, a downlink/uplink control channel, a scrambling code, or the like, thereby capable of performing signal detection, channel estimation, multiplexing, or the like.

A Zadoff-Chu (ZC) sequence is used in many wireless communication systems as a sequence with an excellent cubic metric (CM) property and an excellent correlation property. The ZC sequence is a constant amplitude and zero auto correlation (CAZAC)-type sequence. The CAZAC-type sequence has a constant amplitude in both frequency and time domains when a specific sequence is processed with discrete Fourier transform (DFT) or inverse-DFT (IDFT), and its periodic auto-correlation has an impulse form. Therefore, the CAZAC-type sequence has an ideal property in comparison with other sequences. As a result, a significantly excellent peak-to-average power to ratio (PAPR) and CM property can be provided in general when the ZC sequence is applied to a system such as CDMA, OFDM, OFDMA, SC-FDMA, DFT-spreading OFDM, DFT-spreading OFDMA, WHT (Walsh-Hadamard Transform)-OFDM, WHT-OFDMA, etc.

A ZC sequence having a length of NZC can be generated by Equation 1 below.

MathFigure 1

$$x_u(m) = \begin{cases} e^{-j\frac{\pi um(m+1)}{N_{ZC}}}, & \text{when } N_{ZC} \text{ is odd number} \\ e^{-j\frac{\pi um^2}{N_{ZC}}}, & \text{when } N_{ZC} \text{ is even number} \end{cases}$$ [Math. 1]

where $0 \leq m \leq N_{ZC} - 1$

In Equation 1, u denotes a root index of the ZC sequence, and may be a natural number which is relatively prime to $N_{ZC}$ among natural numbers less than or equal to $N_{ZC}$. Further, the root index u indicates the number of available sequences. Therefore, a greatest number of sequences can be used when $N_{ZC}$ is a prime number. For example, if $N_{ZC}$ is 12 (i.e., a composite number), the number of available sequences is 4 (u=1, 5, 7, 11), and if $N_{ZC}$ is 11 (i.e., a prime number), the number of available sequences is 10 (u=1, 2, . . . , 10). In general, when $N_{ZC}$ is a prime number, a generated sequence has an excellent property.

A long-lengthed sequence is generated in such as manner that a short-lengthed sequence is generated and then a plurality of short-lengthed sequences are gathered to generate the long-lengthed sequence. This is because it is effective to generate the long-lengthed sequence by gathering the plurality of short-lengthed sequences rather than generating the long-lengthed sequence at once. For example, when a 144-bit sequence is generated at once, the number of possible cases to be considered is $2^{144}$. However, when a 72-bit sequence is generated and this sequence is repeated to generate a 144-bit sequence, the number of possible cases to be considered is only $2*2^{72}$. Therefore, an overload of sequence generation can be reduced.

When the long-lengthed sequence is generated by gathering the short-lengthed sequences, a region allocated with the short-lengthed sequences may be referred to as a sub-block. A block is configured by gathering the sub-blocks. Accordingly, a block sequence to be allocated to the block can be formed by gathering a plurality of sub-block sequences allocated to the sub-blocks.

FIG. 3 shows an example of a method of generating a sequence by using sub-blocks.

Each sub-block has a length of T, and the number of sub-blocks is M. Therefore, a length of a block sequence, that is, a size of a block is L=M*T. A transmitter can determine the sub-block length according to a length of a sequence to be transmitted. That is, the transmitter can determine the sub-block length so that the block size is a multiple integer of the sub-block length. Each sub-block is allocated with a sub-block sequence. The number of sub-block sequences allocated to each sub-block may be N. The N sub-block sequences may be one sub-block sequence set.

Referring to FIG. 3, different sub-block sequence sets 100-1, 100-2, . . . , 100-M are respectively allocated to M sub-blocks. The different sub-block sequence sets 100-1, 100-2, . . . , 100-M each include N sub-block sequences, and may have the same information. A block having a length of L is generated by gathering the M sub-blocks, and thus N block sequences having a length of L can be generated.

When a block sequence is generated by allocating different sub-block sequences to a plurality of sub-blocks as shown in FIG. 3, a PAPR and CM property and a cross correlation property can be increased. This is because each sub-block sequence (or sequence set) may have an optimal PAPR/CM/cross correlation property but entire sequences generated by gathering the sub-block sequences (or sequence set) may have a new PAPR/CM/cross correlation property which is not suitable for a channel environment. Therefore, there is a need for a method for generating a sequence with an excellent PAPR/CM/cross-correlation property. In addition, when the entire sequences are generated by using the aforementioned method, if the number of sequences allocated to each sub-block is N, the number of the entire sequences is also limited to N. Accordingly, there is a need to increase the number of available sequences.

Now, the proposed sequence transmission method will be described according to an embodiment of the present invention.

FIG. 4 is a flowchart showing the proposed sequence transmission method according to an embodiment of the present invention.

In step S200, a transmitter generates a block sequence set including a plurality of identical sub-block sequence sets.

First, length of a sub-block can be determined. A sub-block refers to a unit that a sub-block sequence or a sub-block sequence set is allocated. Also, a block refers to a unit that a block sequence or a block sequence set is allocated. Each sub-block has a length of T, and the number of sub-blocks is M. Therefore, a length of the block sequence, that is, a length of the block is L=M*T. A transmitter can determine the sub-block length according to a length of a sequence to be transmitted. That is, the transmitter can determine the sub-block length so that the block size is a multiple integer of the sub-block length. In the present invention, the number of sub-block sequence included sub-block sequence set allocated to a sub-block is assumed N. All sub-block sequence sets allocated to the M sub-blocks are identical. That is, it can be said that one sub-block sequence set is repetitively allocated to a plurality of sub-blocks. Accordingly, a block sequence set having a length of L is generated.

In step S210, the transmitter generates a phase modulated block sequence set by multiplying a phase modulation symbol to sub-block sequence sets constituting the block sequence set and allocated to each of the sub-block.

Phase modulation can be performed on each of the sub-block sequence sets constituting the block sequence set, and thus the phase modulated block sequence set is generated. The phase modulation can be performed in various manners. Although the phase modulation is performed by multiplying the phase modulation symbol to each sub-block sequence set in the present embodiment, this is not for limitation purposes. A phase modulation sequence has a length of M, and each element constituting the phase modulation sequence is the phase modulation symbol. That is, the length of the phase modulation sequence is M, and a length of the block sequence can be known by using the length of the phase modulation sequence. The phase modulation symbol to be multiplied may differ according to each sub-block sequence set. The phase modulation symbol can approximate all values constituting a sequence to q quantized values in the range of 0 to $2\pi$, that is, in a possible phase range. For example, when quadrature phase key shifting (QPSK) modulation is applied, a value corresponding to a phase of QPSK may be $\{\pi/4, 3\pi/4, 5\pi/4, 7\pi/4\}$, and thus all values constituting a sequence may be approximated to $\{\pi/4, 3\pi/4, 5\pi/4, 7\pi/4\}$. Alternatively, when binary phase key shifting (BPSK) modulation is applied, a value corresponding to a phase of BPSK may be $\{0, \pi\}$ or $\{\pi/2, 3\pi/2\}$, and thus all values constituting a sequence may be approximated to $\{0, \pi\}$ or $\{\pi/2, 3\pi/2\}$. In the approximation process, a value may be approximated to the nearest value. Alternatively, the values may be approximated to a value shorter than or equal to the nearest value, or a value longer than or equal to the nearest value. By changing the phase modulation symbol multiplied to the block sequence, the obtained block sequence may have an excellent PAPR/CM/cross-correlation property.

In step S220, the transmitter maps the phase modulated block sequence set to a plurality of sub-blocks. A phase modulated block sequence having a length of L is mapped to M sub-blocks having a length of T respectively.

In step S230, the transmitter transmits the phase modulated block sequence mapped to the plurality of sub-blocks.

If each sub-block is allocated with N sub-block sequences, the number of block sequences may be $2^{M-1}*N$. In order to have N sequences as in the conventional technique, N sequences with an excellent property may be selected from the $2^{M-1}*N$ block sequences. The N sequences may be selected by applying various rules according to a situation such as a channel environment, etc. For example, N sequences with an excellent cross-correlation property may be selected, or N sequences with an excellent CM property may be selected. Accordingly, a desired sequence can be selected by setting a threshold for a desired property.

FIG. 5 shows an example of a phase modulated block sequence obtained by the proposed sequence transmission method. The phase modulated block sequence is generated by multiplying a phase modulation symbol or a phase modulation sequence to each of sub-block sequences constituting a block sequence having a length of L.

FIG. 6 shows another example of a phase modulated block sequence obtained by the proposed sequence transmission method. A bandwidth of 5 MHz may be used in this case. Referring to FIG. 6, a sub-block has a length of 72 bits, and each sub-block may be allocated with 256 sub-block sequences. When the bandwidth is 5 MHz, M may be 2 and an FFT length may be 512. The phase modulated block sequence is generated by multiplying a phase modulation symbol of a phase modulation sequence to each of sub-block sequence sets constituting a block sequence set.

FIG. 7 shows another example of a phase modulated block sequence obtained by the proposed sequence transmission method. A bandwidth of 10 MHz may be used in this case. Referring to FIG. 7, a sub-block has a length of 72 bits, and each sub-block may be allocated with 256 sub-block sequences. When the bandwidth is 10 MHz, M may be 4 and an FFT length may be 1024. The phase modulated block sequence is generated by multiplying a phase modulation symbol of a phase modulation sequence to each of sub-block sequence sets constituting a block sequence set.

FIG. 8 shows another example of a phase modulated block sequence obtained by the proposed sequence transmission method. A bandwidth of 20 MHz may be used in this case. Referring to FIG. 8, a sub-block has a length of 72 bits, and each sub-block may be allocated with 256 sub-block sequences. When the bandwidth is 20 MHz, M may be 4 and an FFT length may be 2048. The phase modulated block sequence is generated by multiplying a phase modulation symbol of a phase modulation sequence to each of sub-block sequence sets constituting a block sequence set.

FIG. 9 is a flowchart showing the proposed sequence transmission method according to another embodiment of the present invention.

In step S300, a transmitter generates a basis sequence set consisting of different sub-block sequence sets. The basis sequence set may include two different sub-block sequence sets. The basis sequence set may have a length corresponding to a minimum system bandwidth.

In step S310, the transmitter generates a block sequence set by repeating the basis sequence set.

The basis sequence set may be repeated to extend a sequence set to an extent corresponding to an integer multiple of the minimum system bandwidth. The basis sequence set may be extended by being repeated in various forms. When the basis sequence set consists of two sequence sets, i.e., a 1st sequence set and a 2nd sequence set, a block sequence set may be generated by alternately repeating the 1st sequence set and the 2nd sequence set. Alternatively, the block sequence set may be generated by first repeating the 1st sequence set and then repeating the 2nd sequence set. There is no restriction on a method of repeating the sequence sets included in the basis sequence set.

In step S320, the transmitter generates a phase modulated block sequence set by multiplying a phase modulation symbol to sub-block sequence sets constituting the block sequence set and allocated to each of the sub-block.

Phase modulation can be performed on each of the sub-block sequence sets constituting the block sequence set, and thus the phase modulated block sequence set is generated. The phase modulation can be performed in various manners. Although the phase modulation is performed by multiplying the phase modulation symbol to each sub-block sequence set in the present embodiment, this is not for limitation purposes. The length of the phase modulation sequence is M, and a size of the block sequence can be known by using the length of the phase modulation sequence. The phase modulation symbol to be multiplied may differ according to each sub-block sequence set. The phase modulation symbol can approximate all values constituting a sequence to q quantized values in the range of 0 to 2π, that is, in a possible phase range. For example, when quadrature phase key shifting (QPSK) modulation is applied, a value corresponding to a phase of QPSK may be {π/4, 3π/4, 5π/4, 7π/4}, and thus all values constituting a sequence may be approximated to {π/4, 3π/4, 5π/4, 7π/4}. Alternatively, when binary phase key shifting (BPSK) modulation is applied, a value corresponding to a phase of BPSK may be {0, π} or {π/2, 3π/2}, and thus all values constituting a sequence may be approximated to {0, π} or {π/2, 3π/2}. In the approximation process, a value may be approximated to the nearest value. Alternatively, the values may be approximated to a value shorter than or equal to the nearest value, or a value longer than or equal to the nearest value. By changing the phase modulation symbol multiplied by the block sequence, the obtained block sequence may have an excellent PAPR/CM/cross-correlation property.

In step S330, the transmitter maps the phase modulated block sequence set to a plurality of sub-blocks. A phase modulated block sequence having a length of L is mapped to M sub-blocks having a length of T.

In step S340, the transmitter transmits the phase modulated block sequence mapped to the plurality of sub-blocks.

FIG. 10 shows an example of a phase modulated block sequence obtained by the proposed sequence transmission method. When a minimum system bandwidth is 5 MHz, the sequence of FIG. 10 corresponds to a basis sequence set. Referring to FIG. 10, a 1st sequence set 400-1 and a 2nd sequence set 400-2 are different from each other, and each have a length of 72 bits. The basis sequence set consisting of the 1st sequence set 400-1 and the 2nd sequence set 400-2 is a block sequence set. A phase modulated block sequence set is generated by multiplying a phase modulation symbol to each of the 1st sequence set 400-1 and the 2nd sequence set 400-2.

FIG. 11 shows another example of a phase modulated block sequence obtained by the proposed sequence transmission method. A bandwidth is 10 MHz in this case. Referring to FIG. 11, a block sequence set includes 1st to 4th sequence sets 410-1, 410-2, 410-3, and 410-4. The 1st to 4th sequence sets 410-1, 410-2, 410-3, and 410-4 each have a length of 72 bits. The 1st sequence set 410-1 and the 3rd sequence set 410-3 are identical to each other. The 2nd sequence set 410-2 and the 4th sequence set 410-4 are identical to each other. That is, the block sequence set of FIG. 11 corresponds to a pattern in which the basis sequence set proposed in FIG. 10 is fully repeated one time. A phase modulated block sequence set is generated by multiplying a phase modulation symbol to each of the 1st to 4th sequence sets 410-1, 410-2, 410-3, and 410-4 constituting the block sequence set.

FIG. 12 shows another example of a phase modulated block sequence obtained by the proposed sequence transmission method. A bandwidth is 10 MHz in this case. Referring to FIG. 12, a block sequence set includes 1st to 4th sequence sets 420-1, 420-2, 420-3, and 420-4. The 1st to 4th sequence sets 420-1, 420-2, 420-3, and 420-4 each have a length of 72 bits. The 1st sequence set 420-1 and the 2nd sequence set 420-2 are identical to each other. The 3rd sequence set 420-3 and the 4th sequence set 420-4 are identical to each other. That is, the block sequence set of FIG. 12 is configured in such a manner that each of sub-block sequences constituting the basis sequence set proposed in FIG. 10 are sequentially repeated one time. A phase modulated block sequence set is generated by multiplying a phase modulation symbol to each of the 1st to 4th sequence sets 420-1, 420-2, 420-3, and 420-4 constituting the block sequence set.

FIG. 13 shows another example of a phase modulated block sequence obtained by the proposed sequence transmission method. A bandwidth is 20 MHz in this case. Referring to FIG. 13, a block sequence set includes 1st to 8th sequence sets 430-1, 430-2, . . . , 430-8. The 1st to 8th sequence sets 430-1, 430-2, . . . , 430-8 each have a length of 72 bits. The 1st sequence set 430-1, the 3rd sequence set 430-3, the 5th sequence set 430-5, and the 7th sequence set 430-7 are identical to one another. The 2nd sequence set 430-2, the 4th sequence set 430-4, the 6th sequence set 430-6, and the 8th sequence set 430-8 are identical to one another. That is, the block sequence set of FIG. 13 corresponds to a pattern in which the basis sequence set proposed in FIG. 10 is fully repeated three times. A phase modulated block sequence set is generated by multiplying a phase modulation symbol to each of the 1st to 8th sequence sets 430-1, 430-2, . . . , 430-8 constituting the block sequence set.

FIG. 14 shows another example of a phase modulated block sequence obtained by the proposed sequence transmission method. A bandwidth is 20 MHz in this case. Referring to FIG. 14, a block sequence set includes 1st to 8th sequence sets 440-1, 440-2, . . . , 440-8. The 1st to 8th sequence sets 440-1, 440-2, . . . , 440-8 each have a length of 72 bits. The 1st sequence set 440-1, the 2nd sequence set 440-2, the 5th sequence set 440-5, and the 6th sequence set 440-6 are identical to one another. The 3rd sequence set 440-3, the 4th sequence set 440-4, the 7th sequence set 440-7, and the 8th sequence set 440-8 are identical to one another. That is, the block sequence set of FIG. 14 corresponds to a pattern in which the basis sequence set pattern proposed in FIG. 10 is repeated three time, while among constitutional elements of the basis sequence set, the 1st sequence set and the 2nd sequence set are alternately allocated two times. A phase modulated block sequence set is generated by multiplying a phase modulation symbol to each of the 1st to 8th sequence sets 440-1, 440-2, . . . , 440-8 constituting the block sequence set.

FIG. 15 shows another example of a phase modulated block sequence obtained by the proposed sequence transmission method. A bandwidth is 20 MHz in this case. Referring to FIG. 15, a block sequence set includes 1st to 8th sequence sets 450-1, 450-2, . . . , 450-8. The 1st to 8th sequence sets 450-1, 450-2, . . . , 450-8 each have a length of 72 bits. The 1st to 4th sequence sets 450-1 to 450-4 are identical to one another. The 5th to 8th sequence sets 450-5 to 450-8 are identical to one another. That is, the block sequence set of FIG. 15 corresponds to a pattern in which the basis sequence set proposed in FIG. 10 is repeated three times, while among constitutional elements of the basis sequence, the 1st sequence set is allocated four times and subsequently the 2nd sequence set is allocated four times. A phase modulated block sequence set is generated by multiplying a phase modulation symbol to each of the 1st to 8th sequence sets 450-1, 450-2, . . . , 450-8 constituting the block sequence set.

FIG. 16 shows another example of a phase modulated block sequence obtained by the proposed sequence transmission method. A bandwidth of 5 MHz is used in FIG. 16(a). A basis sequence set includes a 1st sequence set 460-1 and a 2nd sequence set 460-2. The 1st sequence set 460-1 and the 2nd sequence set 460-2 are different from each other. A bandwidth of 10 MHz is used in FIG. 16(b). A 4th sequence set 470-4 identical to a 1st sequence set 470-1 is allocated after a 2nd sequence set 470-2. A 3rd sequence set 470-3 identical to a 2nd sequence set 470-2 is allocated before the 1st sequence set 470-1. A bandwidth of 20 MHz is used in FIG. 16(c). Subsequent to the block sequence set of FIG. 16(b), that is, subsequent to a 4th sequence set 480-4, a 7th sequence set 480-7 identical to a 2nd sequence set 480-2 and an 8th sequence set 480-8 identical to the 1st sequence set 480-1 are sequentially allocated. Further, prior to a 3rd sequence set 480-3, a 6th sequence set 480-6 identical to the 1st sequence set 480-1 and a 5th sequence set 480-5 identical to the 2nd sequence set 480-2 are sequentially allocated. Accordingly, as a whole, the block sequence set has a structure in which two different sub-block sequence sets are repetitively allocated and circulated.

FIG. 17 is a block diagram showing a transmitter according to an embodiment of the present invention. A transmitter 900 includes a processor 910, a memory 920, and a radio frequency (RF) unit 930.

Referring to FIG. 17, the processor 910 implements the proposed functions, processes, and/or methods. The processor 910 generates a block sequence including a 1st sub-block sequence and a 2nd sub-block sequence, generates a phase modulated block sequence by performing phase modulation on the block sequence, divides the phase modulated block sequence and maps the divided phase modulated block sequence to a plurality of sub-blocks, and transmits the divided phase modulated block sequence mapped to the plurality of sub-blocks. Layers of the radio interface protocol can be implemented by the processor 910. The memory 920 is coupled to the processor 910 and stores a variety of information for driving the processor 910. The RF unit 930 is coupled to the processor 910, and transmits and/or receives radio signals.

The processor 910 may include an application-specific integrated circuit (ASIC), a separate chipset, a logic circuit, and/or a data processing unit. The memory 920 may include a read-only memory (ROM), a random access memory (RAM), a flash memory, a memory card, a storage medium, and/or other equivalent storage devices. The RF unit 930 may include a base-band circuit for processing a radio signal. When the embodiment of the present invention is implemented in software, the aforementioned methods can be implemented with a module (i.e., process, function, etc.) for performing the aforementioned functions. The module may be stored in the memory 920 and may be performed by the processor 910. The memory 920 may be located inside or outside the processor 910, and may be coupled to the processor 910 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for processing a sequence by a transmitting side in a wireless communication system, the method comprising:
dividing the sequence into a first sub-block and a second sub-block, the first sub-block and the second sub-block related to a specific fast Fourier transform (FFT) size;
modulating the first sub-block and the second sub-block; and
repeating the first sub-block and the second sub-block for an FFT size higher than the specific FFT size,
wherein modulating the first sub-block and the second sub-block comprises employing a phase modulation scheme.

2. The method of claim 1, wherein the first sub-block and the second sub-block are repeated in the same order.

3. The method of claim 1, wherein repeating the first sub-block and the second sub-block comprises:
repeating the first sub-block to generate a first copy sub-block which is the same as the first sub-block; and
repeating the second sub-block to generate a second copy sub-block which is the same as the second sub-block.

4. The method of claim 3, wherein the first sub-block, the second sub-block, the first copy sub-block, and the second copy sub-block are allocated in an order of the first sub-block, the second sub-block, the first copy sub-block, and the second copy sub-block.

5. The method of claim 4, wherein:
the second sub-block immediately follows the first sub-block; and
the second copy sub-block immediately follows the first copy sub-block.

6. The method of claim 1, wherein the first sub-block and the second sub-block are for a preamble sequence.

7. The method of claim 1, wherein the modulation is applied by multiplying a phase modulation sequence to the first sub-block and the second sub-block.

8. The method of claim 7, wherein the phase modulation sequence is based on a phase of a binary phase shift keying (BPSK) modulation scheme, the phase of the BPSK modulation scheme being 0 or $\pi$.

9. The method of claim 1, further comprising transmitting the first sub-block and the second sub-block.

10. A method of processing a sequence by a receiving side in a wireless communication system, the method comprising:
receiving a first sub-block and a second sub-block,
wherein the first sub-block and the second sub-block are related to a specific fast Fourier transform (FFT) size,
wherein the first sub-block and the second sub-block are divided from the sequence,
wherein the first sub-block and the second sub-block are phase-modulated, and
wherein the first sub-block and the second sub-block are repeated for an FFT size higher than the specific FFT size.

11. The method of claim 10, wherein the first sub-block and the second sub-block are repeated in the same order.

12. The method of claim 10, further comprising:
receiving a first copy sub-block which is generated by repeating the first sub-block and is the same as the first sub-block; and
receiving a second copy sub-block which is generated by repeating the second sub-block and is the same as the second sub-block.

13. The method of claim 12, wherein the first sub-block, the second sub-block, the first copy sub-block and the second copy sub-block are allocated in order of the first sub-block, the second sub-block, the first copy sub-block and the second copy sub-block.

14. The method of claim 13, wherein:
the second sub-block immediately follows the first sub-block; and
the second copy sub-block immediately follows the first copy sub-block.

15. The method of claim 10, wherein the first sub-block and the second sub-block are for a preamble sequence.

* * * * *